(No Model.)
H. E. MOON & J. W. HARRISON.
ATTACHMENT FOR CLOVER HULLERS.
No. 579,997. Patented Apr. 6, 1897.
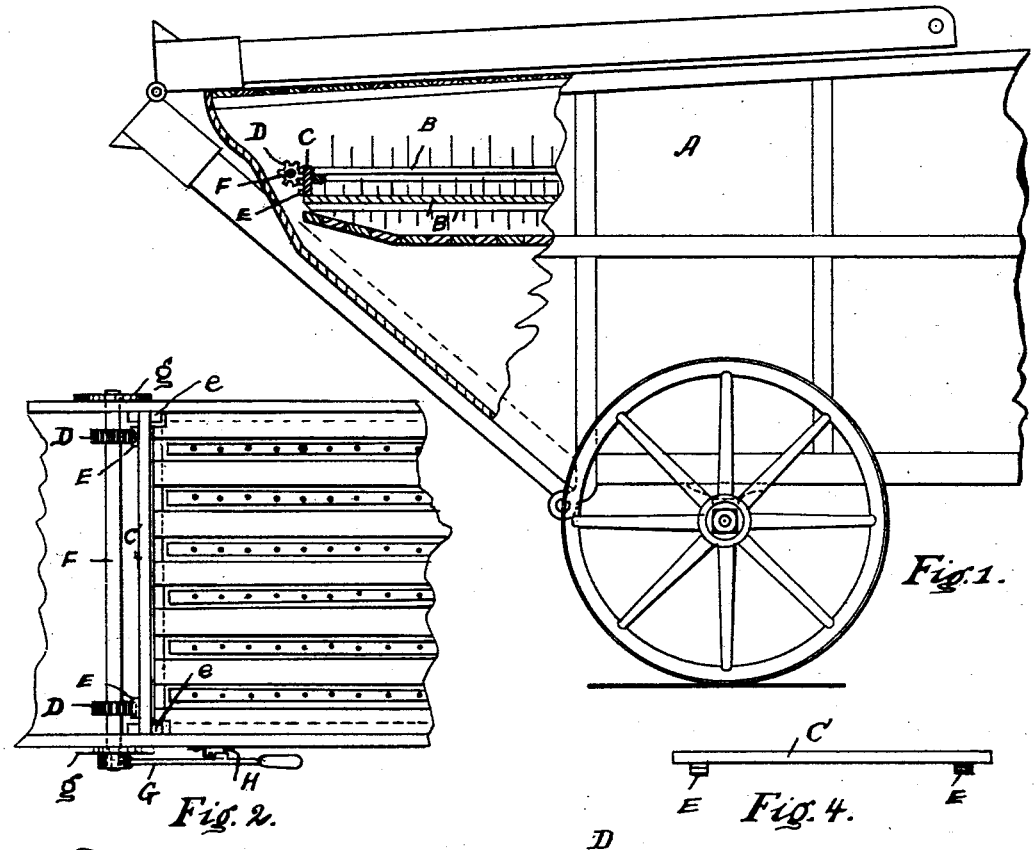
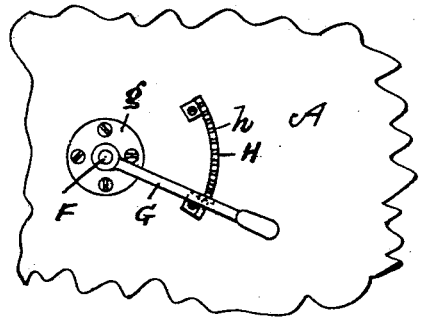
Witnesses:
Chas. Marin.
D. D. Deane.
Inventors:
HOXEY E. MOON.
JOHN W. HARRISON.
BY Thurman & Silvius.
Attorneys.

UNITED STATES PATENT OFFICE.

HOXEY E. MOON AND JOHN W. HARRISON, OF CARTERSBURG, INDIANA.

ATTACHMENT FOR CLOVER-HULLERS.

SPECIFICATION forming part of Letters Patent No. 579,997, dated April 6, 1897.

Application filed August 24, 1896. Serial No. 603,818. (No model.)

*To all whom it may concern:*

Be it known that we, HOXEY E. MOON and JOHN W. HARRISON, citizens of the United States, residing at Cartersburg, in the county of Hendricks and State of Indiana, have invented certain new and useful Improvements in Attachments for Clover-Hullers; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to an attachment to be applied at the rear end of the shakers in a clover-huller; and it consists of a gate or device which is adjustably secured within the huller-frame and by which the seed which usually drops over from the end of the shakers and is carried away and lost with the refuse is retained and saved, as will be more fully described hereinafter and pointed out in the claim.

Referring to the drawings, Figure 1 represents a side elevation of the rear portion of a clover-huller in which a portion is broken away, showing the interior in section; Fig. 2, a top plan of a portion of the rear end of shakers, both showing our invention as applied; Fig. 3, a side elevation of a portion of huller-body, showing a portion of our device; Fig. 4 a top plan, Fig. 5 an end elevation, and Fig. 6 a front elevation, of our device.

In the drawings, A designates a huller which is in common use, having shakers B B', suitably mounted on cranks, so that they cause the clover chaff and seeds to be gradually separated, the seed falling downward while the chaff is pushed along to the rear end and over into a suitable receptacle, thence to the stacker. The chaff in passing over the end carries with it considerable seed which is lost, the amount depending upon the quantity carried on the shakers. To avoid this waste, we provide a gate C, which may be made of any suitable material and of such size as shall adapt it to the huller to which it may be applied.

The gate is an oblong rectangular plate and is provided at its front with two sets of rack-teeth E E. The gate is set in guides e, which are adapted to retain it in all directions except vertically, yet permit of its vertical movement. We provide a metallic shaft F, on which is secured two pinions D D, adapted to mesh with the rack-teeth on the gate, thereby supporting the latter. The shaft is suitably mounted adjacent to the gate and rotatably supported by the huller-frame by means of the journal-plates g g, suitably secured. The lever G is suitably secured at one end to an end of the shaft F, its handled end being adapted to press against a curved rack H, secured to the huller-frame and provided at its outside face with suitable notches h, into any of which the lever is retained, but may be withdrawn and changed to another notch by springing it outward. The side next to the rack may be provided with any suitable rubbing face or rib adapted to the notches. The position of the lever relative to the rack will indicate the relative position of the gate vertically.

By manipulating the lever G the gate C may be so adjusted as to prevent seed from passing over it and will cause them to be deposited on the floor below and saved.

Having thus described our invention, what we claim as new, and desire to secure by Letters Patent, is—

The combination, in a clover-huller of the kind described having shakers B B', of the gate C having rack-teeth E E and mounted as shown at the rear end of said shakers; the shaft F having the pinions D D secured thereto and suitably mounted to control said gate; the notched rack H attached to the huller-body, and the lever G secured to the end of said shaft and arranged to engage the notches in said rack, substantially as described, for the purposes set forth.

In testimony whereof we affix our signatures in presence of two witnesses.

HOXEY E. MOON.
JOHN W. HARRISON.

Witnesses:
JNO. S. THURMAN,
E. T. SILVIUS.